March 22, 1938.  J. N. SCHICHTEL  2,111,811
FIRE HOSE RACK
Filed March 5, 1937
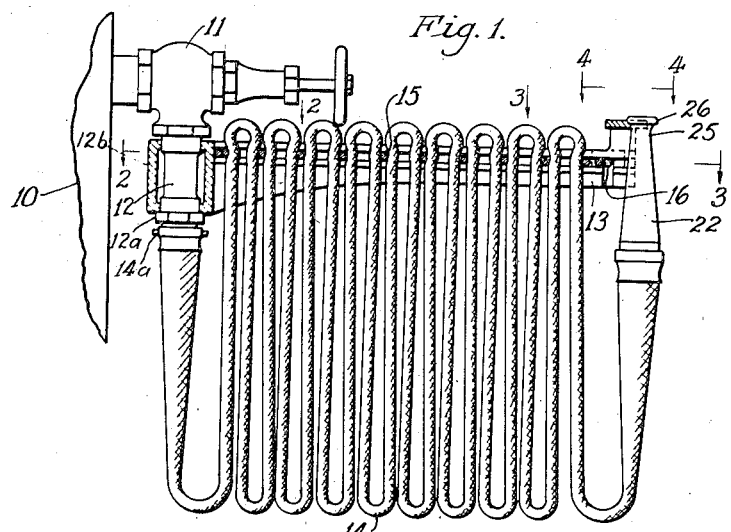
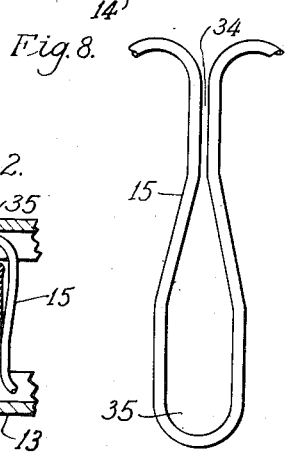
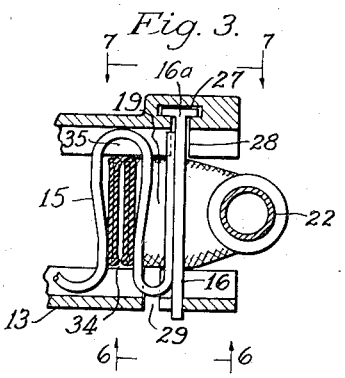
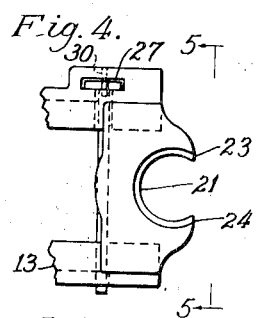
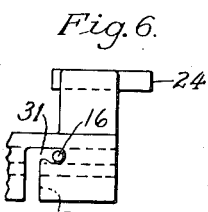
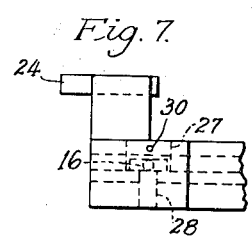
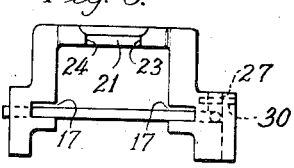
INVENTOR.
John N. Schichtel
BY Ross J. Garofalo
ATTORNEY.

Patented Mar. 22, 1938

2,111,811

UNITED STATES PATENT OFFICE 2,111,811

FIRE HOSE RACK

John N. Schichtel, San Gabriel, Calif.

Application March 5, 1937, Serial No. 129,199

4 Claims. (Cl. 248—90)

The present invention relates to hose supporting devices and more particularly, has to do with hose racks for supporting folded linen fire hose.

In many of the hose racks in use today, the hose is generally supported on pins extending from one arm of the frame to the other. The upper portions of the folds of the hose are usually looped over the pins extending from one arm of the frame to the other in such manner that a pull on the free or nozzle end of the hose permits the hose to be paid out from the rack to the point of use. Some of the prior types of hose racks are so constructed that a simple spreading of the arms of the frame allows the entire hose to fall out of the rack together with all of the pins with the result that the hose becomes entangled and some of the pins are lost. To avoid loss of pins, some hose rack manufacturers hinge one end of the pins on one of the arms of the frame and allow the other ends to be supported by the other arm. Many other improvements have been made on these types of hose racks but all depend upon looping the folds of the hose over the pins in order to support the hose. One great disadvantage of this type of hose rack resides in the great inconvenience in carefully placing the hose in the rack. Another disadvantage resides in the fact that the least jarring or twisting of the hose in the rack by meddlers results in the complete removal of the banded hose from the rack. This is particularly true when the hose is soft due to use or age. Another disadvantage is the entanglement of the hose when pulled out of the rack and one of the greatest disadvantages resides in the fact that the operator must completely pay-out the hose from the rack before it is possible to turn on the water.

It is thus a primary object of my invention to provide a rack for supporting folded linen hose which comprises few and simple parts, which is not likely to get out of order, from which the linen hose may be readily and instantly detached without danger of becoming entangled, and upon which the hose may be easily, conveniently and compactly supported in the rack.

It is a further object of my invention to provide a hose rack that is simple in construction, cheap to produce and which can be readily mounted on a water pipe without danger of impairing its operation.

Another object of my invention is to provide a hose rack of such construction that when the hose is placed in position in the rack, the hose will not be readily jarred or twisted from its fixed position when anyone meddles with the hose or rack.

Another object of the invention is to devise a rack in which the hose may be replaced without necessity of removing the frame from its supporting nipple.

Another object of my invention is to provide a hose rack which will permit the water to be turned on when the hose is in place in the rack without danger of entanglement of the hose.

Briefly stated, my invention resides in a hose supporting device comprising a frame provided with a spring for supporting the folds of the hose.

More specifically, the hose supporting device forming the subject matter of my invention comprises a U-shaped frame provided with a flat spring forming a series of joined or continuous sigmoids or rickracks which is adapted to slide in and be supported in a horizontal plane by grooves provided in the inner side of the arms of the frame, said spring being adapted to receive and support the folds of the hose. The open ends of the sigmoids or rickracks forming the flat spring are narrow in comparison with the loops or closed ends so that a fold of hose may be inserted in the open end and be extended into the loops. The folds may thus be supported in the openings of the spring by the tension of the spring at the narrow portion of the openings. Means are provided on one end of the frame for locking the spring in the frame. Also means are provided on the frame for supporting the nozzle of the hose in an upright position.

Other objects, advantages and features of novelty and construction will appear from the following detailed description taken in connection with the accompanying drawing forming part of the specification in which:

Fig. 1 is a side elevation of the hose rack showing the same as supporting the hose;

Fig. 2 is a plan section taken on line 2—2 of Fig. 1;

Fig. 3 is a plan section taken on line 3—3 of Fig. 1;

Fig. 4 is a plan view of the frame showing the portion shown in Fig. 1 by lines 4—4 with, however, the nozzle not being shown in the supporting jaws;

Fig. 5 is an end view of the frame as shown by lines 5—5 of Fig. 4;

Fig. 6 is an elevation of the frame as shown by lines 6—6 of Fig. 3;

Fig. 7 is an elevation of the frame as shown by lines 7—7 of Fig. 3;

Fig. 8 is a plan view of a portion of the spring for supporting the hose in the frame of the rack showing the shape of the spring when a fold of the hose is not placed therein.

Referring more particularly to the drawing, the reference numeral 10 designates a part of the wall with standpipe outlet valve 11 shown as emerging from the wall. The standpipe outlet valve 11 controls the flow of water from the standpipe through a union or nipple 12. Nipple 12 passing through a hole 12b provided in the frame also supports the U-shaped frame 13 and hose 14 which is in position as it will be held by spring 15 when in place. The hose rack assembly is adapted to swing in a horizontal plane about the nipple 12, being limited only in its movement by the walls adjacent the rack. Hose 14 is secured to the nipple by means of a coupling 14a. A nut 12a is threaded to one end of the nipple 12 and serves to support the frame 13. The frame is provided with a pin 16 extending from one arm of the frame to the other which serves to lock the spring in the frame.

The element 15 is a flat spring having a series of joined or continuous sigmoids or rickracks and which is supported between the locking pin 16 and the inner portion of the rear end 18 of the frame. The flat spring is adapted to slide in the frame in grooves 17 and supported thereby which grooves are provided on the inner surfaces of each arm of the U-shaped frame. The spring is of such length that when the hose is placed in the spaces provided by the joined sigmoids or rickracks, it will fit snugly between 16 and 18. In other words, when the spring is placed in the rack without the hose, a sufficient amount of play is permitted so that when the folds of the hose are secured in the open spaces of the spring, thus extending the length of the spring, the assembly will rest between 16 and 18 without any or little play and preferably under a slight tension.

19 and 20 shown in Figs. 3 and 2, respectively, are the end loops of the spring. Preferably, none of the folds of the hose are placed in these loops or open spaces.

On the end of the frame and preferably permanently fixed to the top of both arms of the frame, I have included a cross bar 21 which is provided at its center with jaws 23 and 24 for receiving and supporting the nozzle 22 which is of the usual construction and which is generally provided with a constricted end 25 and a head or collar 26. Thus, the constricted end of the nozzle may be inserted between the jaws 23 and 24 and the collar of the nozzle is allowed to rest on the jaws provided in the cross-bar. The latter is spaced above the grooves 17 so as to not interfere with the insertion of the spring member 15 in its supporting grooves.

The locking pin 16 is provided with a short head 16a forming a T with the long end of the pin which rests in a horizontal slot 27 provided in the arm of the frame. The same arm is provided with a vertical slot 28 which extends into the horizontal slot 27 so that the pin is free to hang in a vertical position when detached from a catch provided in the opposite arm as will be described. A pin 30 is provided above the slot 27 in order to prevent the pin from being removed from the frame.

On the opposite arm from which the pin is secured is another vertical slot 29 which is preferably disposed slightly rearward of the slot 28 so that it will be necessary to force the pin toward the spring in order to engage it in the slot 29.

The slot 29 extends into a catch 31 which receives the pin 16 and therefore prevents dropping of the pin from the slot when the pin is engaged in the catch to hold the spring in place in the frame.

Referring again to the spring 15, as stated previously, it is shaped into series of joined or continuous sigmoids or rickracks, the joined sigmoids or rickracks forming narrow spaces 34 and wide spaces 35 for the insertion of the folds of the hose. The narrow portions of the joined sigmoids or rickracks are adjacent the wide portions of adjacent sigmoids or rickracks. The width of the space 35 is approximately the same width as the folds of the hose while the width of the space 34 is smaller than the width of the fold so that a tension is caused to be placed on the fold when it is inserted in the opening. When the spring is in a contracted position, that is, when the hose is not retained by the spring, a pair of the joined sigmoids or rickracks resembles the vertical section of a bottle as shown in Fig. 8. When the spring is extended as when the hose is placed in the narrow openings of the spring, it assumes the shape as shown in Figs. 2 and 3. The extreme ends of the spring are preferably straight so that they may present a straight bearing surface against the inner wall 18 of the frame and the pin 16 as shown in Figs. 2 and 3, respectively. The spring may be formed by twisting a round spring wire into the shape described above.

In operation, in order to mount the hose in the rack, the spring is removed from the frame by merely forcing the free end of pin 16 rearward until it is in line with the slot 29 and then forcing the pin downwardly in the slot until it clears the frame. The pin can then hang on its head 16a. The spring is then slid out of the frame on grooves 17. The hose is then folded and the top end of each fold is inserted into the narrow openings 34 of the joined or continuous sigmoids, starting preferably with the second opening closest the end of the spring which when placed in the frame abuts the end 18 of the frame. The insertion of the folds of the hose is continued until they enter the wide portion 35 of the opening. In normal position, the folds of the hose are centrally spaced in each opening. Thus, it will be seen that in mounting the hose in the spring, it will be necessary to alternate the insertion of the folds. Preferably, the first opening 20 and the last opening 19 do not contain any fold of hose. When the mounting of the hose on the spring is completed, the assembly is slid back into the frame until the end 20 abuts the surface 18. The locking pin 16 is then fastened in the catch 31. To fasten the pin in the catch, it may be necessary to push the spring assembly against the surface 18 in order that the pin is clear to engage slot 29. This is not an objectionable feature since it is preferable to have a slight tension against the folds of the hose as it prevents the hose from easily falling from the spring.

After the locking pin is engaged, the hose is coupled to the coupling 14a and the nozzle is then supported in the jaws 23 and 24.

In the event of fire or in other words when it is desired to readily dismount the hose from the rack, the nozzle is removed from its supporting jaws and with the locking pin still in its locked position, it is merely necessary to pay the hose out by a slight downward pull on the hose. For the first two or three folds, it may be necessary to give the hose a slight extra pull downwardly as the tension on these folds is the greatest. After two or three of the folds have been dismounted, the removal of the remainder of the hose may be readily accomplished by merely pulling on the hose while walking to the point of use.

Due to the tension placed on the folds by the spring, it is possible to turn the water on before the hose is withdrawn from the rack. The tension of the spring pinches the upper ends of the folds to such an extent that it is impossible to cause water to pass through the hose until the very last fold is removed from the spring. This is a desirable advantage over racks heretofore employed where the folds are supported by pins since in such cases, it is necessary to pay out the hose first before turning on the water, otherwise the hose will become entangled and may fly out of the rack toward the operator.

From the above it will be seen that I have provided a hose rack which is simple in construction, which may be manufactured at low cost, and on which the hose may be easily mounted or removed.

The foregoing description of my invention is merely exemplary of one modification of my invention and is not to be considered as limiting since obviously many modifications thereof may be made without departing from the scope of the following claims.

I claim:

1. A hose rack comprising a substantially U-shaped frame, a horizontal groove on each arm of said frame, a flat spring shaped into a series of joined sigmoids, said joined sigmoids forming alternating openings into which the folds of hose may be inserted, said openings being narrow at one end and wider at the other end and said spring being adapted to slide in and be supported by the horizontal grooves in the arms of said frame, means on said frame for locking the spring in said grooves and means on said frame for supporting the nozzle of a hose.

2. A hose rack comprising a substantially U-shaped frame, a horizontal groove on the inside surface of each arm of said frame, a flat spring formed into a plurality of joined sigmoids, a pair of such joined sigmoids having a narrow opening extending into a larger closed space, said opening and space being adapted to receive a fold of hose, said entire spring being sufficiently resilient to permit the folds of hose to be placed in said openings and to place a tension on the folds of the hose and said spring being adapted to slide in said grooves of said frame and be supported in a horizontal plane thereby, and means for locking said spring on said frame.

3. In a hose rack, a frame provided with grooves adapted to support a flat spring and a flat spring shaped into a series of joined sigmoids, said joined sigmoids forming alternating openings into which the folds of hose may be inserted and said spring being adapted to slide in and be supported by the grooves of said frame.

4. In a hose rack, a frame provided with grooves adapted to support a flat spring and a flat spring formed into a plurality of joined sigmoids, said joined sigmoids forming alternating openings into which the folds of hose may be inserted, said entire spring being sufficiently resilient to receive a fold of hose in each of its openings and said spring being adapted to slide in and be supported by the grooves of said frame in a horizontal plane, means on said frame for locking the spring in said frame, said locking means being positioned on said frame a sufficient distance from one end of said frame so as to place a tension on said spring when supporting a fold of hose in each of the openings of said spring.

JOHN N. SCHICHTEL.